July 27, 1965  H. C. HIMS  3,196,889
OVERSPEED GOVERNORS

Filed April 19, 1962  2 Sheets-Sheet 1

United States Patent Office 3,196,889
Patented July 27, 1965

3,196,889
OVERSPEED GOVERNORS
Herbert C. Hims, Northumberland, England, assignor to The Parsons and Marine Engineering Turbine Research and Development Association, Northumberland, England
Filed Apr. 19, 1962, Ser. No. 188,722
Claims priority, application Great Britain, Apr. 21, 1961, 14,562
11 Claims. (Cl. 137—56)

This invention relates to overspeed governors of the kind for limiting the maximum speed of rotary members, such as the shafts of turbines, of any description where practicable, such governors operating to release fluid, e.g. oil, pressure from a relay either to reduce or cut off the power supply for rotating the rotary member—in the case of a turbine, reducing or cutting off the power supply includes reducing or cutting of the supply of pressure medium—or to operate a warning means.

The object of the present invention is to provide forms of overspeed governors in which no striking mechanism is involved and in which no substantial relative movements of parts can occur during operation, and in particular no very small relative axial movements of cylindrical surfaces due to vibration under normal running conditions, thus avoiding failure or deterioration of performance due to fretting and/or fretting corrosion.

According to the invention, an overspeed governor, for limiting the maximum speed of a rotary member, comprises a rocking member pivoted to the rotary member for a small rocking movement about an axis spaced from the longitudinal axis of the rotary member in a plane at right angles to the longitudinal axis of said rotary member, the centrifugal forces acting on said rocking member being out of equilibrium about said pivot axis when said rotary member rotates, at least one spring being provided to bias said rocking member against said rocking movement, a pressure fluid duct being provided for connection to a relay, and rotary valve means being defined by a part of said rotary member and a part of said rocking member, said pressure fluid duct having an exit controlled by said rotary valve means, and said exit being closed when said rocking member is in its unrocked position and said exit being open when said rocking member is in its rocked position, whereby, in operation, said relay can be arranged to be actuated by the rocking of said rocking member on said rotary member attaining a rotational speed equal to or greater than said maximum speed.

Normally, said rotary valve will be provided on said pivot axis such that the rocking of the rocking member opens this rotary valve.

It is desirable that the governor as a whole is arranged to be dynamically balanced about said longitudinal axis in the unrocked position of the rocking member, and in some arrangements, it can be dynamically arranged to be balanced both in the rocked and unrocked positions of the rocking member.

If said rotary member is a shaft of a turbine installed in a ship, it is desirable that the governor should be shock-proof, particularly in respect of non-contact explosions. Ship's turbines are usually installed with their axes of rotation fore and aft, and the fore and aft components of any acceleration due to shocks are usually of little or no consequence. Thus it is normally only desirable that the governor should be shock-proof against accelerations having a component at right-angles to said longitudinal axis, and it is possible to shock proof the governor of this invention against an acceleration in any direction at right angles to said longitudinal axis.

The said at least one spring can be a helical spring with its axis on said longitudinal axis. It is preferred that only one such spring is used, and such a spring would be sensibly unaffected by centrifugal force, thus eliminating the extreme difficulty of designing a suitable spring for a high speed governor when the spring is disposed radially.

Suitable warning means are well known. Adjusting means may be provided for altering the value of said predetermined speed, and may for instance, include screw means for altering the position of, or the amount of, the out-of-balance mass which gives rise to the non-equilibrium of said centrifugal forces or means for altering the compression or tension of said spring.

The invention will be further described, by way of example, with reference to the accompanying drawings, of which:

Figure 1:
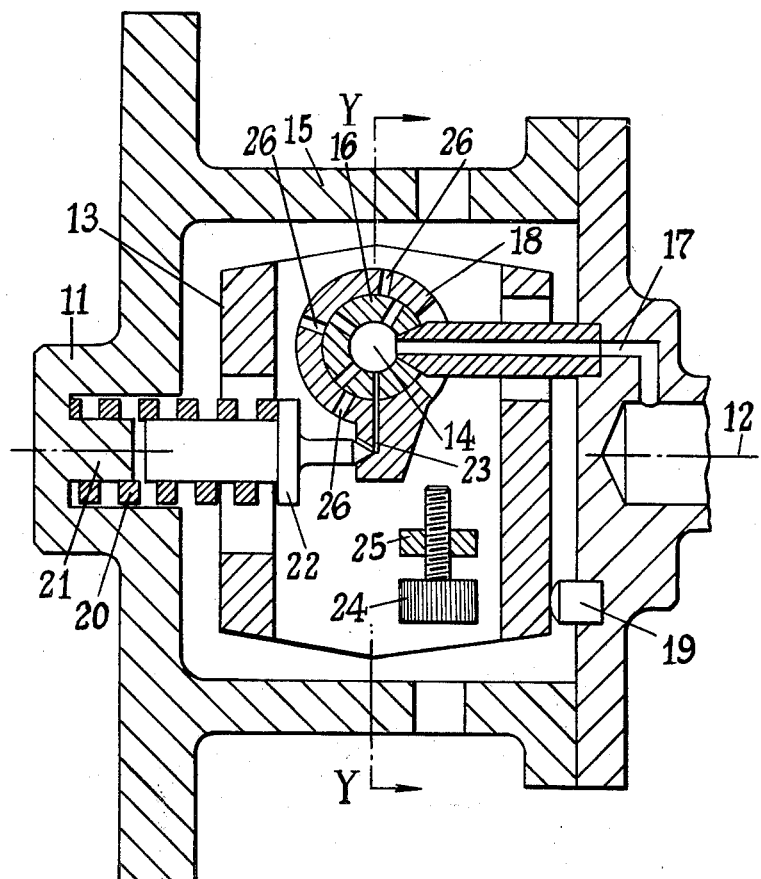
FIGURE 1 is a plan view of a second convenient construction of governor in accordance with the present invention, partly in section along the line X—X of FIGURE 2.
Figure 2:
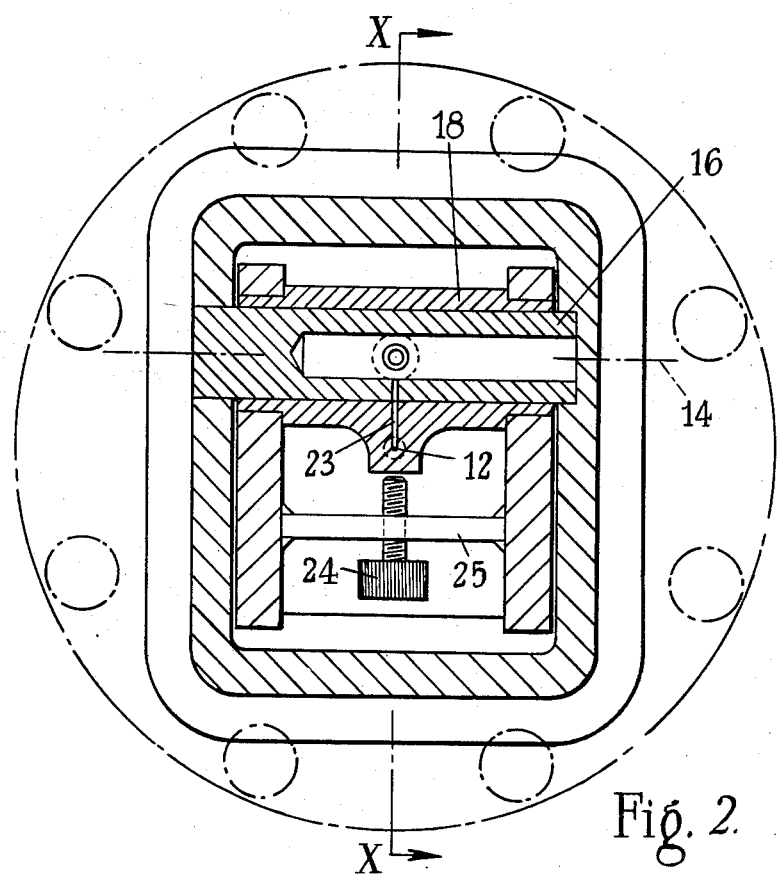
FIGURE 2 is an end view of the governor of FIGURE 1, partly in section along the line Y—Y of FIGURE 1.
Figure 3:
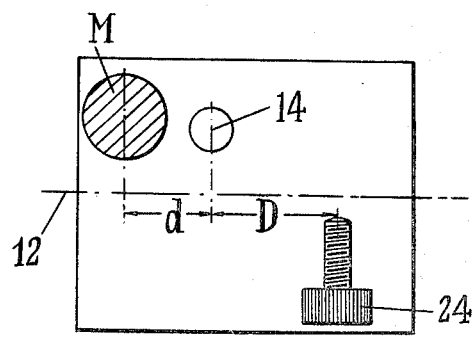
FIGURE 3 is a diagram showing the principle of shock-proofing and adjustment of the tripping speed of the governor of FIGURES 1 and 2.

In FIGURES 1, 2 and 3, the longitudinal axis of a rotary member 11 is indicated at 12. A rocking member 13 is pivoted on an axis 14 within a cage or chamber 15 defined by the rotary member 11. The pivot 16 forms one member of a rotary valve and is connected to an oil duct 17 for connection to a relay, whereas the other member of the rotary valve is formed by a cross-sleeve 18 on the member 13. The rotary member 11 is provided with a stop 19 for the member 13, and a helical compression spring 20 is supported with its axis on the longitudinal axis of the rotary member 11 between a boss 21 on the rotary member 11 and a knife-edged member 22 supported in turn by its knife-edge on the cross sleeve 18. An oil-way 23 is provided for the lubrication of this knife-edge.

A trip-speed adjusting screw 24 is shown, screwed into a cross-member 25 on the member 13.

In FIGURE 3, the resolved mass of the rocking member 13 (no account being taken of the screw 24, mass $m$) is represented as a point mass at M. For the governor to be shock-proof in a particular direction at right angles to said longitudinal axis, $Md=mD$, the distance $d$, $D$ being as shown and at right angles to said particular direction. The adjustment of the tripping speed by screwing the screw 24 along its own axis alters the radius of rotation of the effective out-of-balance mass which gives rise to the non-equilibrium of the centrifugal forces acting on the member 13 without altering the equation $Md=mD$.

In operation, the member 13 remains in the position shown in FIGURE 1 until a predetermined speed of revolution of the rotary member 11 is reached, when the member 13 rotates about the axis 14 in a clockwise direction (with reference to FIGURE 1) against the pressure of the spring 20 and opens the rotary valve 16, 18, so that oil is exhausted through the ports 26, thus actuating the relay.

In the governor shown in the drawings, no striking mechanism is employed and there are no pins, sleeves or other fittings moving axially with relation to each other. The only appreciable movement of metal on metal is a turn through a small angle of a comparatively large and well lubricated pivot or pin. Consequently deterioration of performance due to fretting or fretting corrosion is inhibited.

Most conveniently, the governor may be mounted on a stub shaft attached to a turbine spindle which stub shaft, carrying the complete governor assembly, can be removed for setting the tripping speed and balancing. Assuming the availability of a suitable driving rig, the complete assembly can be removed periodically and tested for correct operation.

The governor described in the drawings is intended for use with a lubricating oil relay of the type that operates on a sudden release of pressure from a system to which the supply is restricted. Such relays are well known, and are not shown or further described.

I claim:

1. A rotary member including an overspeed governor for limiting the maximum rotational speed of said rotary member, said governor comprising a rocking member pivoted to said rotary member for a small rocking movement about an axis spaced from the longitudinal axis of the rotary member in a plane at right angles to the longitudinal axis of said rotary member, the centrifugal forces acting on said rocking member being out of equilibrium about said pivot axis when said rotary member rotates, at least one spring being provided to bias said rocking member against said rocking movement, a pressure fluid duct being provided for connection to a relay, and rotary valve means being defined by a part of said rotary member and a part of said rocking member, said pressure fluid duct having an exit controlled by said rotary valve means, and said exit being closed when said rocking member is in its unrocked position and said exit being open when said rocking member is in its rocked position, whereby, in operation, said relay can be arranged to be actuated by the rocking of said rocking member on said rotary member attaining a rotational speed equal to or greater than said maximum speed.

2. A rotary member as claimed in claim 1, in which the rocking member is biased by a single helical spring having its axis lying along the axis of the rotary member.

3. A rotary member as claimed in claim 2 comprising an extension of the rocking member extending into the axial region of the rotary member, and means operatively connecting said spring to said extension.

4. A rotary member as claimed in claim 2, comprising an extension of the part of the rocking member forming the said rotary valve means, said extension reaching into the axial region of the rocking member, and means operatively connecting said spring to said extension.

5. A rotary member as claimed in claim 1, comprising a movable weight on the rocking member and means for adjusting the position of the weight to vary centrifugal forces on the rocking member and control the said maximum speed.

6. A rotary member as claimed in claim 1 in the form of a turbine shaft having a stub shaft mounted in one end thereof, the overspeed governor being mounted on the said stub shaft.

7. A rotary member including an overspeed governor for limiting the maximum rotational speed of the said rotary member, said governor including a rocking member mounted on the rotary member for rotation therewith and for rocking movement about a pivot axis spaced from the rotational axis of the rotary member in a plane at right angles thereto, the rocking member being such that on rotation of the rotary member and rockable member the centrifugal forces generated tend to rotate the rocking member in one direction about the pivot axis, spring means being provided to counteract the centrifugal forces while the rotational speed is below a predetermined value, a feed pressure control valve being associated with the rocking member to be actuated by the movement of the rocking member consequent upon over-speeding of the rotary member, and means for reducing the speed of the rotary member upon actuation of the control valve.

8. A rotary member as claimed in claim 7, in which the rocking member is biased by a single helical spring having its axis lying along the axis of the rotary member.

9. A rotary member as claimed in claim 8, comprising an extension of the rocking member extending into the axial region of the rotary member, and means operatively connecting said spring to said extension.

10. A rotary member as claimed in claim 7, comprising a movable weight on the rocking member and means for adjusting the position of the weight to vary centrifugal forces on the rocking member and control the said maximum speed.

11. A rotary member as claimed in claim 7, in the form of a turbine shaft for marine use, the said shaft being a stub shaft mounted in one end thereof, the overspeed governor being mounted on the said stub shaft.

References Cited by the Examiner

UNITED STATES PATENTS

| | | | |
|---|---|---|---|
| 838,725 | 12/06 | Larkin | 137—56 XR |
| 1,565,100 | 12/25 | Nutt | 137—56 XR |
| 1,720,652 | 7/29 | Hamersveld | 137—56 |
| 1,723,589 | 8/29 | Hamersveld | 137—56 |
| 1,759,641 | 5/30 | Cook | 137—56 XR |
| 2,080,243 | 5/37 | Warner | 73—549 XR |
| 3,016,911 | 1/62 | Strand | 137—33 |

ISADOR WEIL, *Primary Examiner.*

CLARENCE R. GORDON, *Examiner.*